March 9, 1926.
R. B. SHANCK
TELEGRAPH KEY
Original Filed April 14, 1923
1,575,650
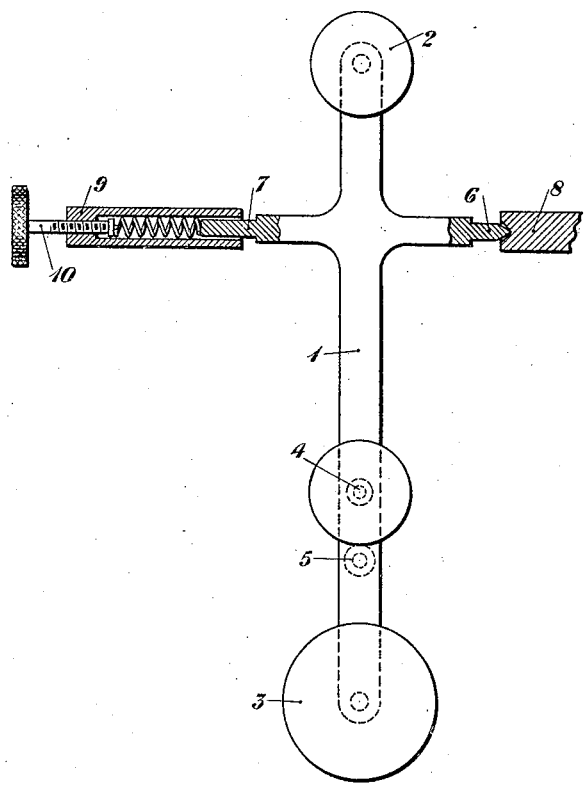
INVENTOR
R.B. Shanck
BY
ATTORNEY Patented Mar. 9, 1926.

1,575,650

UNITED STATES PATENT OFFICE.

ROY B. SHANCK, OF WOODSIDE, NEW YORK, ASSIGNOR TO AMERICAN TELEPHONE AND TELEGRAPH COMPANY, A CORPORATION OF NEW YORK.

TELEGRAPH KEY.

Application filed April 14, 1923, Serial No. 632,147. Renewed October 5, 1925.

*To all whom it may concern:*

Be it known that I, ROY B. SHANCK, residing at Woodside, in the county of Queens and State of New York, have invented certain Improvements in Telegraph Keys, of which the following is a specification.

This invention relates to telegraph keys, and more particularly to telegraph keys mounted by means of trunnions and trunnion bearings.

The object of the invention is to provide in such telegraph keys an arrangement of the trunnions and bearings which will avoid lost motion in the trunnions and its detrimental effects.

In the ordinary telegraph key of this class, it is difficult to make the adjustment of trunnions and bearings such that lost motion is negligible without causing binding of the trunnions. It is obvious that with a loose adjustment there are changes in the position of the key lever and resulting variations in the contact travel. Since many telegraph operators exert a variable side pressure with the thumb on the side of the key knob, lost motion in the bearings tends to cause uneven or faulty signals.

Applicant's improved arrangement avoids lost motion in the trunnions and the consequent variation in contact travel, due to side pressure, by including on one side a trunnion and bearing of novel construction. The arrangement will be clearly understood when the following detailed description is read in connection with the accompanying drawing, in which the single figure represents a plan view, partly in section, of a telegraph key mounted according to applicant's invention.

With reference to the details of the drawing, 1 is the key lever, 2 is the back-stop, and 3 is the key knob. 4 indicates the position of the retractile spring which controls the vertical movement of the lever, and 5 indicates the position of the contacts.

The trunnion 6 is of the usual form, with a conical end. The bearing 8 is also of the usual form, having a conical recess designed to receive the end of the trunnion 6. The opposite trunnion 7 is cylindrical in form. The bearing 9 has a cylindrical recess designed to receive the trunnion 7. In this recess there is seated a helical spring, which bears against the outer end of the trunnion 7. The screw 10 bears against the outer end of the helical spring and is designed to adjust the compression of the spring.

With applicant's arrangement of trunnions and bearings, the helical spring exerts sufficient pressure on the one trunnion to insure a tight fit of the other trunnion in its bearing. It is understood that the improved trunnion and bearing may be placed on either side of the lever, according to whether the instrument is designed for use by a right-handed or a left-handed operator.

The above description of one specific key and mounting is understood to be merely for purposes of illustration. The scope of the invention is to be determined by the appended claims.

It is pointed out that the arrangement described above is applicable to other apparatus than the ordinary type of telegraph key—for instance, certain semi-automatic transmitters.

What is claimed is:

1. A telegraph key including a lever, two trunnions, bearings designed to receive said trunnions, one of said bearings containing a recess within which is seated a spring, and means associated with said bearing for adjusting the compression of said spring.

2. A telegraph key including a lever, two trunnions, a bearing with a conical recess designed to receive one of said trunnions, a second bearing with a cylindrical recess designed to receive the second trunnion, a spring seated in said cylindrical recess, and means associated with said second bearing for adjusting the compression of said spring.

3. A telegraph key including a lever, two trunnions, a bearing with a conical recess designed to receive one of said trunnions, a second bearing with a cylindrical recess designed to receive the second trunnion, a spring seated in said cylindrical recess and designed to bear inwardly against said second trunnion, and means for adjusting the compression of said spring, said means consisting of a screw designed to bear against the outer end of said spring.

4. In a telegraph key including two trunnions designed to engage with corresponding bearings, a trunnion cylindrical in form, a corresponding bearing having a cylindrical recess designed to receive said trunnion, and a spring seated in said recess.

5. In a telegraph key including two trunnions designed to engage with corresponding bearings, a trunnion cylindrical in form, a corresponding bearing having a cylindrical recess designed to receive said trunnion, a spring seated in said recess, and means for adjusting the compression of said spring.

6. In a telegraph key including two trunnions designed to engage with corresponding bearings, a trunnion cylindrical in form, a corresponding bearing having a cylindrical recess designed to receive said trunnion, a spring seated in said recess, and means for adjusting the compression of said spring, said means consisting of a screw designed to bear against the outer end of said spring.

7. In a telegraph key, the combination of a conical trunnion, a bearing with conical recess designed to receive said conical trunnion, a second trunnion cylindrical in form, a second bearing with cylindrical recess designed to receive said second trunnion, a spring seated in said cylindrical recess, and means associated with said second bearing for adjusting the compression of said spring.

8. A telegraph key including a lever, two trunnions, bearings designed to receive said trunnions, one of said bearings containing a recess within which is seated a helical spring, and means associated with said bearing for adjusting the compression of said helical spring.

9. A telegraph key including a lever, two trunnions, a bearing with a conical recess designed to receive one of said trunnions, a second bearing with a cylindrical recess designed to receive the second trunnion, a helical spring seated in said cylindrical recess, and means associated with said second bearing for adjusting the compression of said helical spring.

10. A telegraph key including a lever, two trunnions, a bearing with a conical recess designed to receive one of said trunnions, a second bearing with a cylindrical recess designed to receive the second trunnion, a helical spring seated in said cylindrical recess and designed to bear inwardly against said second trunnion, and means for adjusting the compression of said spring, said means consisting of a screw designed to bear against the outer end of said spring.

11. In a telegraph key including two trunnions designed to engage with corresponding bearings, a trunnion cylindrical in form, a corresponding bearing having a cylindrical recess designed to receive said trunnion, and a helical spring seated in said recess.

12. In a telegraph key including two trunnions designed to engage with corresponding bearings, a trunnion cylindrical in form, a corresponding bearing having a cylindrical recess designed to receive said trunnion, a helical spring seated in said recess, and means for adjusting the compression of said spring.

13. In a telegraph key including two trunnions designed to engage with corresponding bearings, a trunnion cylindrical in form, a corresponding bearing having a cylindrical recess designed to receive said trunnion, a helical spring seated in said recess, and means for adjusting the compression of said spring, said means consisting of a screw designed to bear against the outer end of said spring.

14. In a telegraph key, the combination of a conical trunnion, a bearing with conical recess designed to receive said conical trunnion, a second trunnion cylindrical in form, a second bearing with cylindrical recess designed to receive said second trunnion, a helical spring seated in said cylindrical recess, and means associated with said second bearing for adjusting the compression of said helical spring.

In testimony whereof, I have signed my name to this specification this 12th day of April, 1923.

ROY B. SHANCK.